(12) United States Patent
Nagaya et al.

(10) Patent No.: US 7,329,072 B2
(45) Date of Patent: Feb. 12, 2008

(54) CLAMPING MECHANISM FOR CUTTING INSERT, AND CUTTING INSERT

(75) Inventors: Hidehiko Nagaya, Yuuki-gun (JP); Norio Aso, Yuuki-gun (JP); Hiroaki Hayashizaki, Tsukuba (JP); Yasuharu Imai, Yuuki-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 11/303,749

(22) Filed: Dec. 15, 2005

(65) Prior Publication Data

US 2006/0159527 A1 Jul. 20, 2006

(30) Foreign Application Priority Data

Dec. 16, 2004 (JP) ............................. 2004-364618
Jul. 7, 2005 (JP) ............................. 2005-198503

(51) Int. Cl.
*B23B 27/16* (2006.01)
(52) U.S. Cl. .................... 407/109; 407/110; 407/117
(58) Field of Classification Search ............... 407/109, 407/102, 110, 107, 117, 116
See application file for complete search history.

(56) References Cited

U.S. PATENT DOCUMENTS

| | | | |
|---|---|---|---|
| 5,076,738 A * | 12/1991 | Pano et al. | 407/110 |
| 5,360,298 A | 11/1994 | Hedlund | |
| 5,921,724 A * | 7/1999 | Erickson et al. | 407/117 |
| 5,934,843 A | 8/1999 | Brask et al. | |
| 6,010,281 A | 1/2000 | Coutat et al. | |
| 6,176,649 B1 | 1/2001 | Friedman et al. | |
| 6,565,292 B2 * | 5/2003 | Hecht | 407/110 |

FOREIGN PATENT DOCUMENTS

| | | |
|---|---|---|
| DE | 25 33 035 A1 | 2/1977 |
| EP | 0 654 316 A1 | 11/1994 |
| EP | 0 568 513 B1 | 12/1997 |
| EP | 0878260 | 11/1998 |
| EP | 1072344 | 1/2001 |
| EP | 1 252 954 A | 10/2002 |
| JP | 4-26162 Y2 | 6/1992 |
| JP | 06-071505 A | 3/1994 |
| JP | 3063685 U | 8/1999 |
| WO | WO-99/15297 A1 | 4/1999 |

OTHER PUBLICATIONS

Patent Abstracts of Japan for JP06-071505 published Mar. 15, 1994
Patent Abstracts of IL124496 published May 29, 2003 from the esp@cenet database.
English Translation of Japanese Utility Model Application No. 04-26162 published on Jun. 24, 1992.

* cited by examiner

*Primary Examiner*—Willmon Fridie, Jr.
(74) *Attorney, Agent, or Firm*—Darby & Darby (57) ABSTRACT

There is disclosed a clamping mechanism for a cutting insert that clamps the cutting insert by inserting the cutting insert into an insert mounting seat. The insert mounting seat is formed in a tip of a holder having a pair of contacting surfaces facing each other, and the cutting insert has a pair of contact surfaces to come in contact with the pair of contacting surfaces, respectively. The tip of the holder is provided with a pair of jaws that is formed with the pair of contacting surfaces, respectively, and that can be elastically deformed relatively in a direction that the contacting surfaces contact the contact surfaces, and a clamping means that elastically deforms the pair of jaws to bring relatively the pair of contacting surfaces close to each other and to separate them relatively from each other.

17 Claims, 8 Drawing Sheets

CLAMPING MECHANISM FOR CUTTING INSERT, AND CUTTING INSERT

BACKGROUND OF THE INVENTION

INCORPORATION BY REFERENCE

The present application claims priority under 35 U.S.C. §119 to Japanese Patent Application Nos. 2004-364618 filed on Dec. 16, 2004 and 2005-198503 filed Jul. 7, 2005. The contents of the applications are incorporated herein by reference in their entireties.

1. Field of the Invention

The present invention relates to a clamping mechanism for a cutting insert for clamping the cutting insert to an insert mounting seat of a holder to detachably attach the cutting insert and a cutting insert clamped by the clamping mechanism, in an insert detachable tool used for, for example, grooving or cutting-off of work material.

2. Description of the Related Art

As such a clamping mechanism for a cutting insert used for grooving or cutting-off, the following clamping mechanism is known. That is, a pair of jaws opened to the tip side is formed at a tip of a holder so as to be elastically deformed, and a portion between the jaws is used as an insert mounting seat. A cutting insert is inserted into the insert mounting seat and sandwiched by both of the jaws, whereby a pair of mutually facing contacting surfaces of these jaws comes in contact with and is pressed against a pair of contact surfaces, respectively, of the cutting insert, thereby clamping the cutting insert. Generally, in elastically deforming the jaws to clamp the cutting insert, for example, as described in Japanese Patent No. 3188790, a means of screwing a clamping screw inserted through one jaw into the other jaw to bend the one jaw toward the other jaw to bring them close to each other is adopted. Japanese Utility Model Registration No. 3063685 also suggests elastically deforming a pair of jaws to widen the spacing between the contacting surfaces, with a dedicated working tool, such as a slot expansion key, when a cutting insert is inserted, extracting the key after the cutting insert has been inserted, and then screwing a clamping screw to fasten the cutting insert, thereby clamping it.

Meanwhile, in order to insert the cutting insert into the insert mounting seat before the clamping, the spacing between the pair of contacting surfaces should be made greater to no small extent than the pair of contact surfaces of the cutting insert, and a gap, though slight, should be provided between both of the contacting and contact surfaces. However, as described in Japanese Patent No. 3188790, in the clamping mechanism of simply elastically deforming the jaws with the clamping screw to fasten the cutting insert, such a gap is required in a state in which the jaws are not elastically deformed. When the clamping screw is screwed from there to fasten the cutting insert, the jaws should be greatly deformed as much as the gap, and a large force is required for screwing of the clamping screw. Also in the jaws that are elastically deformed greatly in this way, a reaction force when the one elastically deformed jaw will return to its original state that is not deformed acts in a reverse direction to a direction that the cutting insert is fastened. Therefore, there is a fear that a reduction in a clamping force may be caused.

Meanwhile, according to the claming mechanism described in Japanese Utility Model Registration No. 3063685, since the cutting insert is inserted after the jaws are once expanded by the slot expansion key, the contacting surfaces can come in contact with the contact surfaces in a state in which the key has been extracted after the insertion, and the clamping screw can be further screwed to strongly press the cutting insert to clamp it. However, in the clamping mechanism described in Japanese Utility Model Registration No. 3063685, in addition to a working tool, such as a wrench, when the clamping screw is inserted, the dedicated working tool, such as the slot expansion key, is required when the cutting insert is inserted. Thus, management of these working tools becomes cumbersome and complicated and a plurality of kinds working tools should be used properly. Therefore, the clamping work itself also becomes cumbersome and complicated inevitably.

SUMMARY OF THE INVENTION

The invention has been made under these circumstances. It is an object of the invention to provide a clamping mechanism for a cutting insert and a cutting insert clamped by the clamping mechanism, capable of obtaining a clamping force enough to securely hold the cutting insert and avoiding compelling workers to do extra labor, complicated management of working tools, or clamping work, in the clamping mechanism in which the cutting insert is sandwiched and clamped by the pair of jaws, as described above.

In order to achieve the above object by solving the problems, according to an aspect of the invention, there is provided a clamping mechanism for a cutting insert that clamps the cutting insert by inserting the cutting insert into an insert mounting seat. The insert mounting seat is formed in a tip of a holder having a pair of contacting surfaces facing each other. The cutting insert has a pair of contact surfaces to come in contact with the pair of contacting surfaces, respectively. The tip of the holder is provided with a pair of jaws that is formed with the pair of contacting surfaces, respectively, and that is capable of being elastically deformed relatively in a direction that the contacting surfaces come in contact with the contact surfaces, and a clamping means that elastically deforms the pair of jaws to relatively bring the pair of contacting surfaces close to each other and to relatively separate them from each other.

BRIEF DESCRIPTION OF THE DRAWINGS

FIG. 5 is a cross-sectional view taken along line YY in FIG. 3, which shows the first embodiment of the clamping mechanism of the invention;

FIG. 8 is a cross-sectional view corresponding to the cross-sectional view taken along line ZZ in FIG. 3, which shows a fourth embodiment of the clamping mechanism of the invention.

DESCRIPTION OF THE PREFERRED EMBODIMENTS

Figure 1:
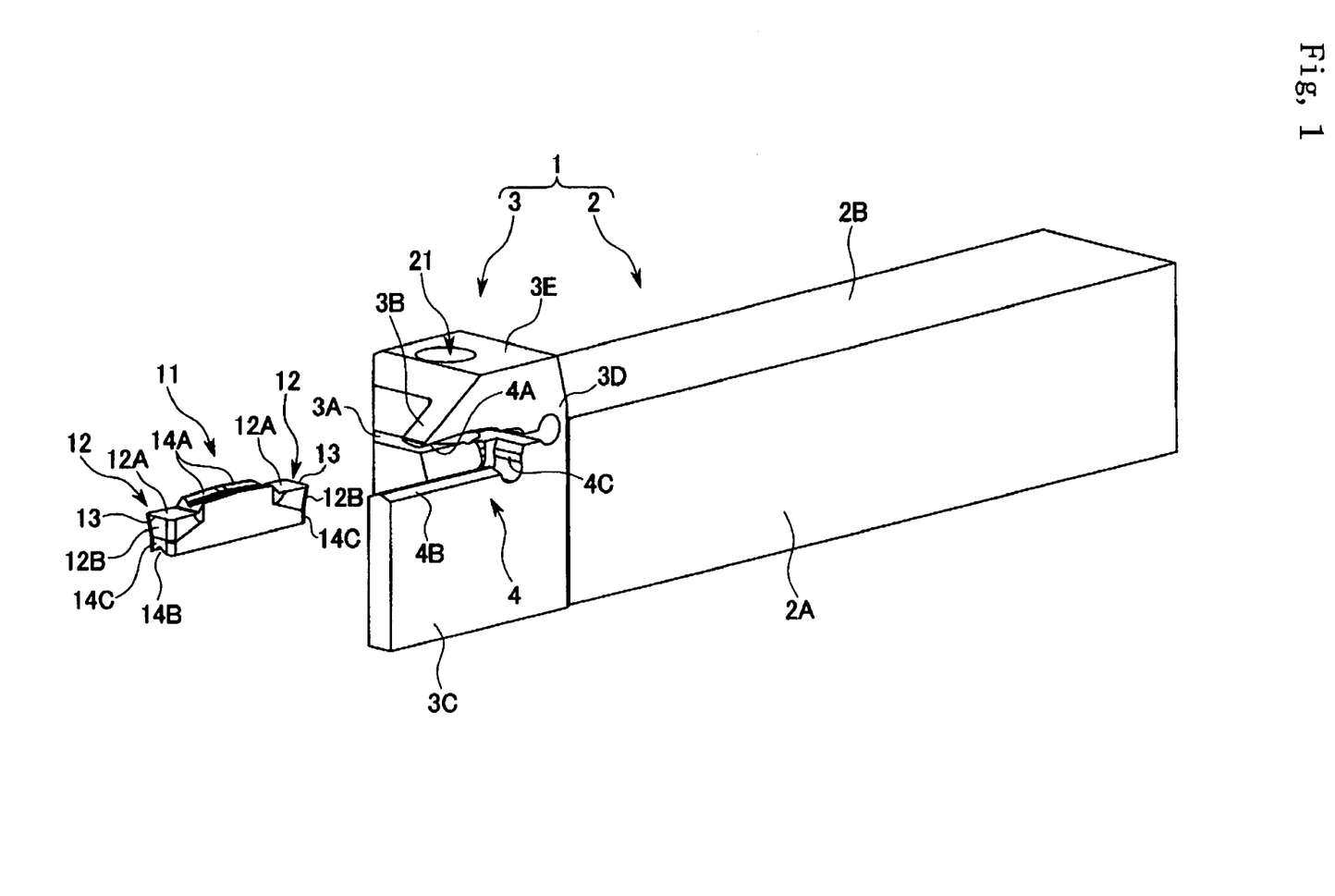
FIG. 1 is an exploded perspective view showing a holder 1 of an insert detachable tool to which a first embodiment of a clamping mechanism of the invention is applied, and a cutting insert 11 of a first embodiment of the invention.
Figure 2:
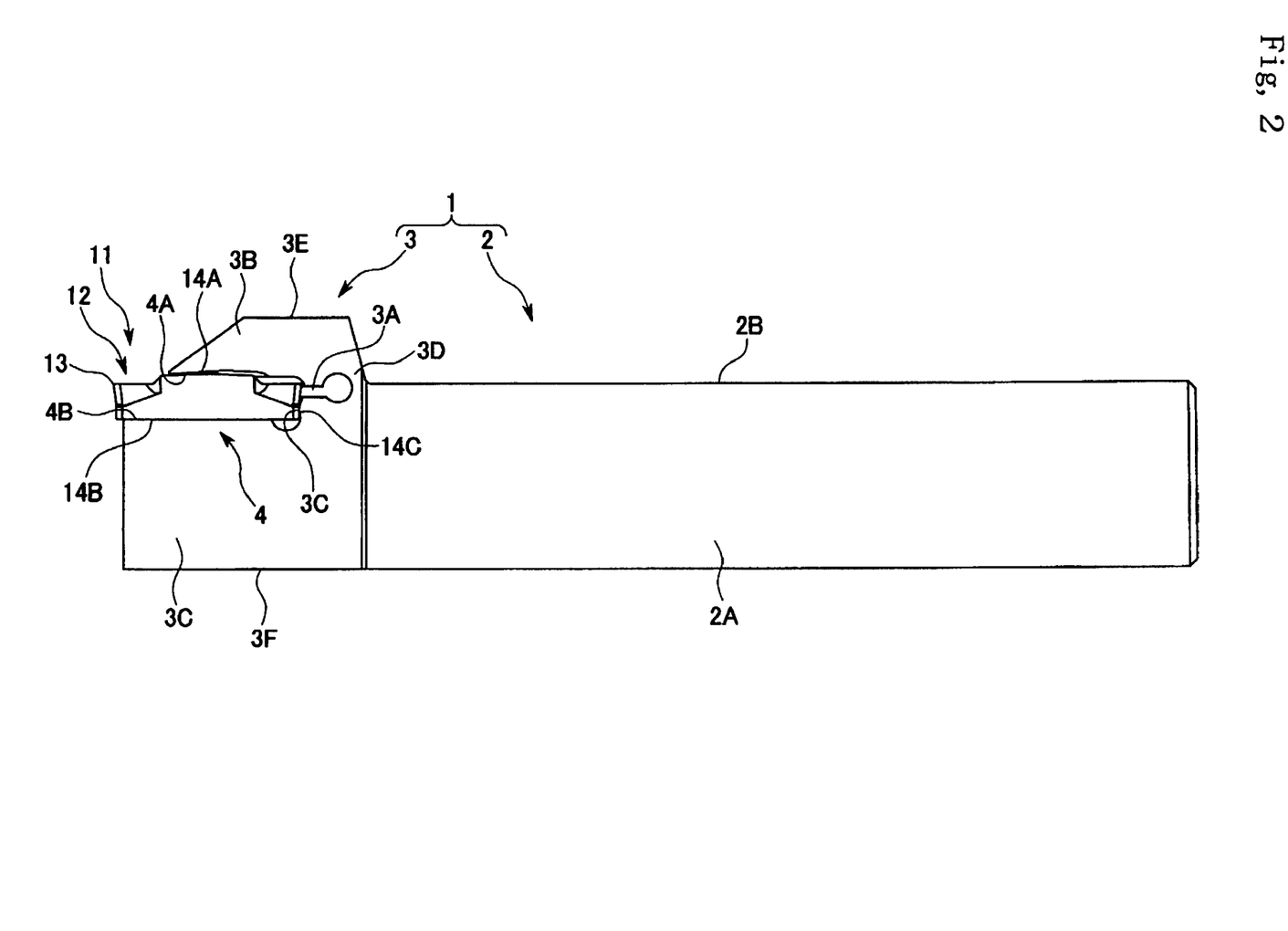
FIG. 2 is a side view of the insert detachable tool shown in FIG. 1.
Figure 3:
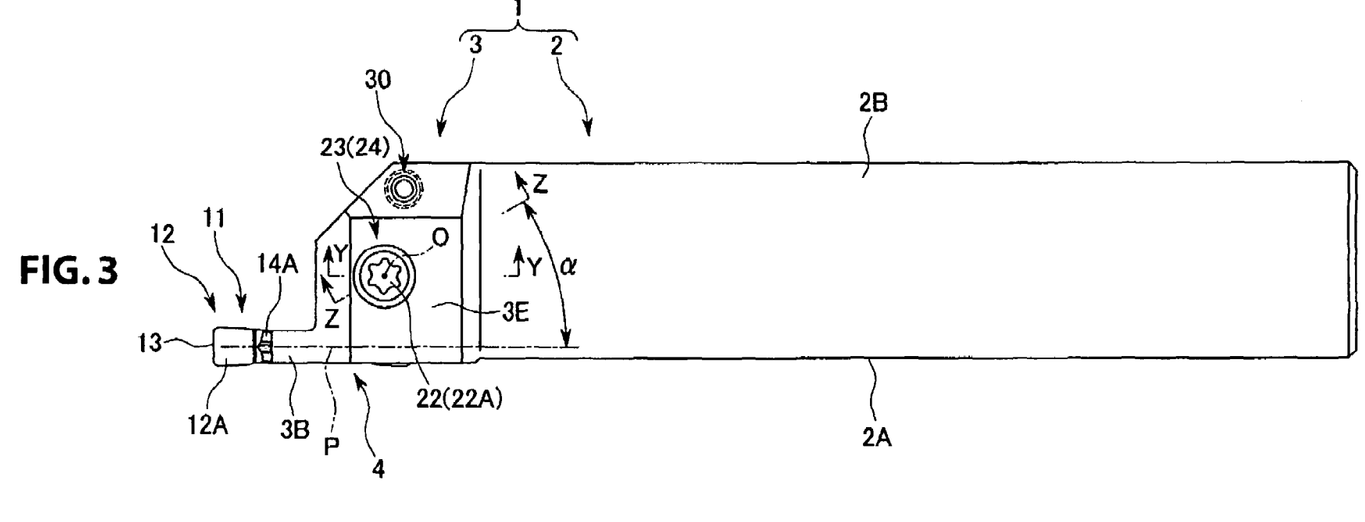
FIG. 3 is a plan view of the insert detachable tool shown in FIG. 1.

FIGS. 1 to 5 show an insert detachable tool to which a first embodiment of a clamping mechanism of the invention is applied. In this insert detachable tool, a holder 1 is made of steel, etc., and has a quadrangular prismatic shank 2 at a rear end (on the right side in FIGS. 2 and 3) as shown in FIGS. 1 to 4, and a head 3 at a tip (on the left side in FIGS. 2 and 3) that protrudes slightly laterally from a side surface 2A of the shank 2 as shown in FIG. 3 in plan view and that protrudes so as to rise from a top surface 2B of the shank 2 as shown in FIG. 2 in side view from the side surface 2A.

The head 3 is formed with a slit 3A along an extension face of the top surface 2B of the shank 2 from the tip side, and an upper jaw 3B (one jaw in the present embodiment) above the slit 3A, as shown in FIG. 2, is smaller in thickness in a direction orthogonal to the extension face than a lower jaw (the other jaw in the present embodiment) 3C below the slit. The cross-sectional area of a connecting portion 3D to be connected with the shank 2, which is defined by the slit 3A, is also made smaller than the cross-sectional area of a connecting portion between the lower jaw 3C and the shank 2, so that the upper jaw 3B is allowed to be elastically deformed so as to be bent toward the lower jaw 3C about the connecting portion 3D as a fulcrum.

An open groove of the slit 3A at the side surface 2A is formed with an insert mounting seat 4 that forms a concave groove shape wider than the slit 3A in an up-and-down direction. This insert mounting seat 4 is formed so as to be opened to the tip of the head 3 and extend toward the rear end, so that a pair of contacting surfaces 4A and 4B is formed at portions of the insert mounting seat 4 at the upper and lower jaws 3B and 3C so as to face each other in the up-and-down direction. Accordingly, in the present embodiment, a direction (the up-and-down direction in FIGS. 4 and 5) perpendicular to the extension face, in which the pair of contacting surfaces 4A and 4B faces each other, is defined as an contacting direction. The pair of jaws 3B and 3C is allowed to be elastically deformed relative to each other in this contacting direction.

Of the above jaws, the lower jaw 3C is formed such that its tip extends in the shape of a rectangular flat plate toward the tip along the side surface 2A of the shank 2, so that the contacting surface 4B (the other contacting surface in the present embodiment) at the lower jaw 3C is formed so as to extend to about the middle of the slit 3A in a longitudinal direction of the holder 1 from the tip of the lower jaw 3C. On the other hand, a tip of the upper jaw 3B at the side surface 2A is formed in the shape of a triangular plate having an oblique side that approaches the lower side as it goes toward the tip so as to extend along the rectangular flat plate formed by the lower jaw 3C. It is noted here that this tip is caused to retreat from the tip of the lower jaw 3C, and the contacting surface 4A (one contacting surface in the present embodiment) at the upper jaw 3B is provided so as to extend from a position closer to the tip side than a longitudinal central portion of the contacting surface 4B of the lower jaw 3C to a position slightly closer to the tip side than a rear end of the contacting surface 4B. In addition, at a rear end of the insert mounting seat 4, a third contacting surface 4C facing the tip side is formed in the lower jaw 3C, so that the slit 3A is provided so as to extend to a position immediately before the rear end of the head 3 beyond the third contacting surface 4C.

Figure 4:
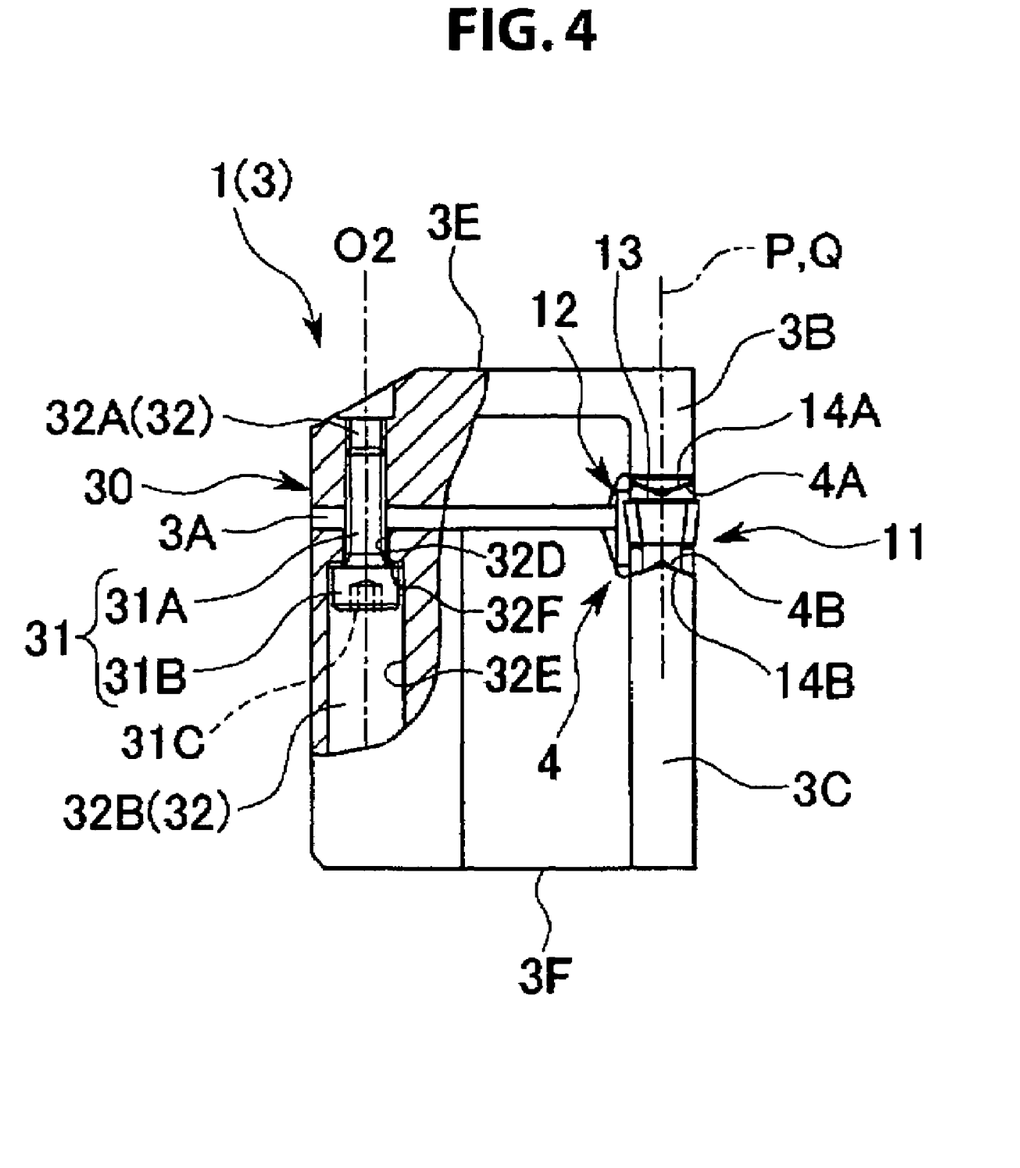
FIG. 4 is a front view of the insert detachable tool shown in FIG. 1.

Further, the pair of contacting surfaces 4A and 4B is formed in a V-shape such that they become convex in each contacting direction in a cross-section orthogonal to the longitudinal direction, that is, one contacting surface 4A becomes convex toward the other contacting surface 4B (the lower side in FIG. 4), while the other contacting surface 4B becomes convex toward the one contacting surface 4A (the upper side in FIG. 4). Moreover, these contacting surfaces 4A and 4B are formed so as to be symmetric with respect to a common plane P that extends in the contacting direction through a widthwise (a right-and-left direction in FIG. 4) central portion of each of the contacting surfaces 4A and 4B, in the cross-section orthogonal to the longitudinal direction similar to the above.

Furthermore, the other contacting surface 4B of the contacting surfaces 4A and 4B, which is formed in the lower jaw 3C, extends straight along the longitudinal direction over its entire longitudinal length, and is constant in the cross-section orthogonal to the longitudinal direction, while the one contacting surface 4A of the contacting surfaces, which is formed in the upper jaw 3B, is inclined at a constant angle of inclination such that its tip portion approaches the other contacting surface 4B (the lower side in FIG. 2) as it goes toward the tip, in a state in which the upper jaw 3B is not elastically deformed. In addition, a portion of the one contacting surface 4A closer to the rear end than the inclined tip portion is inclined toward the other contacting surface 4B as it goes toward the rear end, at a constant angle of inclination gentler than the above angle of inclination, via an extremely short portion of the longitudinal central portion of the one contacting surface 4A, which extends straight along the longitudinal direction, in the state in which the upper jaw 3B is not elastically deformed similar to above.

A cutting insert 11 of one embodiment of the invention to be mounted on such an insert mounting seat 4 is a so-called dog bone type of cutting insert that is formed in a substantially quadrangular prismatic shape with hard material, such as cemented carbides, and has cutting edge portions 12 at both longitudinal ends thereof. Specifically, in these cutting edge portions 12, their top surfaces are used as rake faces 12A that are gradually widened as they go toward both ends thereof and have a substantially isosceles trapezoidal shape in plan view, tip faces (both end faces of the cutting insert 11) of the cutting edge portions 12 are used as flank faces 12B, and cutting edges 13 are formed in intersecting ridge-lines of the rake faces 12A and the flank faces 12B, that is, in side ridges of the rake faces 12A at both ends of the insert.

Moreover, a portion between the cutting edge portions 12 at both ends of the top surface of the cutting insert 11 and a bottom surface of the cutting insert are formed with a pair of contact surfaces 14A and 14B to come in contact with the pair of contacting surfaces 4A and 4B, respectively, of the insert mounting seat 4. It is noted here that the cross-sections of the contact surfaces 14A and 14B orthogonal to the longitudinal direction of the cutting insert 11 are formed in a V-shape so as to be engaged with the contacting surfaces 4A and 4B with which they come in contact in the cross-sections, respectively. In addition, the cutting insert 11 of the present embodiment has a symmetrical shape with respect to a plane orthogonal to the longitudinal direction in its longitudinal central portion, and a plane Q that extends orthogonal to this plane so as to bisect the contact surfaces 14A and 14B in their widthwise central portions.

Further, the lower contact surface (the other contact surface in the present embodiment) 14B of the contact surfaces is formed so as to extend along the longitudinal direction of the cutting insert 11 and has a constant cross-section over the entire length thereof, while the upper contact surface 14A (one contact surface in the present embodiment) is formed so as to extend parallel to the bottom surface of the cutting insert 11 in an extremely short range of its longitudinal central portion. Also, the contact surface 14A is inclined so as to approach the other contact surface 14B at the same constant angle of inclination as the angle of inclination formed by the contacting surface 4A, as it goes from the central portion toward both ends, and is formed such that its cross-section orthogonal to the inclined direction is a constant cross-section. Moreover, below the flank faces 12B of the cutting edge portions 12 on both end faces of the cutting insert 11, third contact surfaces 14C are formed so as to be perpendicular to the longitudinal direction of the cutting inset 11. One of the third contact surfaces comes in contact with the third contacting surface 4C when the cutting insert 11 is inserted into the insert mounting seat 4 from its tip side.

Also, the head 3 at the tip of the holder 1 is provided with a clamping means 21 that elastically deforms the pair of jaws 3B and 3C to relatively bring them close to each other in the contacting direction and relatively separate them from each other in the contacting direction. It is noted here that, in the present embodiment, the upper jaw 3B to be one jaw is smaller in thickness in the contacting direction than the lower jaw 3C to be the other jaw, as described above, so that the upper jaw 3B is elastically deformed relative to the lower jaw 3C to come closer to or separate from it. Further, in a state in which the upper jaw 3B is not elastically deformed, the spacing in the contacting direction between the pair of contacting surfaces 4A and 4B is equal to the spacing between the pair of contact surfaces 14A and 14B of the cutting insert 11, or is slightly smaller than the spacing. Accordingly, in a state in which the other contact surface 14B at the bottom surface of the cutting insert 11 comes in contact with the other contacting surface 4B of the lower jaw 3C, an inclined tip portion of the contacting surface 4A of the upper jaw 3B is brought into close contact with and comes in contact with an inclined portion at the tip of the one contact surface 14A at the top surface of the cutting insert 11.

Here, the clamping means 21 of the present embodiment, as shown in FIG. 5, is a clamping screw 22 that is inserted through the head 3 at the tip of the holder 1 in the contacting direction from below. The clamping screw 22 has a male threaded portion 22A threadedly attached to the upper jaw 3B beyond the slit 3A, and a head 22B having a larger diameter than the male threaded portion 22A, and received in the lower jaw 3C. End faces of the male threaded portion 22A and the head 22B at both ends of the clamping screw 22 are respectively formed with engaging holes 22C that is engaged with a general-purpose working tool, such as a wrench. In addition, in the present embodiment, the outer shape of the head 22B is formed in the shape of a substantially thick-walled disk about a centerline O of the male threaded portion 22A.

Correspondingly, the head 3 is formed with a mounting hole 23 into which the clamping screw 22 is mounted. The mounting hole 23 is composed of a threaded hole 24 to which the male threaded portion 22A at the upper jaw 3B is threadedly attached, and a receiving hole 25 that is formed coaxially with the threaded hole 24 to receive the head 22B at the lower jaw 3C. In the present embodiment, the centerline of the mounting hole 23, that is, the centerline 0 of the male threaded portion 22A of the clamping screw 22 mounted into the mounting hole 23 is perpendicular to the extension face of the top surface 2B of the shank 2 along which the slit 3A extends. In addition, the threaded hole 24 of these passes through the upper jaw 3B from the slit 3A and is opened to the top surface 3E of the head 3 (the top surface of the upper jaw 3B) that is parallel to the extension face.

Meanwhile, the receiving hole 25 also passes through the lower jaw 3C and is opened to the slit 3A toward the upper jaw 3B from the bottom surface 3F of the head 3 (the bottom surface of the lower jaw 3C), and is composed of a smaller diameter portion 25A and a larger diameter portion 25B, in the named order downward from the slit 3A. The smaller diameter portion has an inner diameter that is smaller than the diameter of the head 22B of the clamping screw 22 and slightly larger than that of the male threaded portion 22A. The larger diameter portion 25B has an inner diameter that is larger than the diameter of the smaller diameter portion 25A such that it can receive the head 22B of the clamping screw 22. Accordingly, the male threaded portion 22A of the clamping screw 22 can be loosely fitted into the smaller diameter portion 25A with slight clearance. In addition, a connecting portion between the smaller diameter portion 25A and the larger diameter portion 25B becomes an annular flat face 25C perpendicular to the centerline O in the present embodiment.

Moreover, on an opening of the larger diameter portion 25B toward the bottom surface 3F and opposite to the upper jaw 3B, a female threaded portion (threaded portion) 25D having the inner diameter of thread ridges which is equal to the inner diameter of the larger diameter portion 25B, and a countersunk portion 25E that has an inner diameter further larger than that of thread valleys of the female threaded portion 25D are also formed in this order downwardly. Also, in a state in which the clamping screw 22 is mounted into the mounting hole 23 by threadedly attaching the male threaded portion 22A to the threaded hole 24 and receiving the head 22B in the larger diameter portion 25B of the receiving hole 25, and the head 22B comes in contact with the flat face 25C by screwing the male threaded portion 22A, a lid 26 is attached to the opening of the larger diameter portion 25B toward the bottom surface 3F. The lid is made by integrally forming a male threaded portion 26A threadedly attached to the female threaded portion 25D and a disk-shaped portion 26B having a larger diameter than that of the male threaded portion 26A, which comes in contact with and is received in the countersunk portion 25E when the male threaded portion 26A is screwed into the female threaded portion 25D. In addition, the twist direction of the threads in the male threaded portion 26A of the lid 26 and the female threaded portion 25D of the receiving hole 25 is reverse to the twist direction of the threads in the threaded hole 24 in the upper jaw 3B and the male threaded portion 22A of the clamping screw 22.

Accordingly, the male threaded portion 22A is screwed into the threaded hole 24 so as to advance toward the top surface 3E of the head 3 as described above, whereby a rear face of the head 22B of the clamping screw 22 comes in contact with the flat face 25C of the receiving hole 25 to the side where the pair of contacting surfaces 4A and 4B relatively approaches each other (in the present embodiment, to the side where the one contacting surface 4A approaches the other contacting surface 4B) in the contacting direction. Also, the male threaded portion 22A is further screwed from here, whereby the pair of jaws 3B and 3C is elastically deformed so as to relatively approach each other (in the present embodiment, to the side where the one jaw 3B approaches the other jaw 3C), and correspondingly, the pair of contacting surfaces 4A and 4B also approaches each other, thereby narrowing the spacing.

Contrary to this, when the male threaded portion 22A is loosened from the threaded hole 24 so as to retreat with respect to the top surface 3E, an end face of the head 22B of the clamping screw 22, which is formed with the engaging hole 22C, comes in contact with the lid 26 to the side where the pair of jaws 4A and 4B relatively separates from each other (in the present embodiment, to the side where the one contacting surface 4A separates from the other contacting surface 4B) in the contacting direction. As the male threaded portion 22A is further loosened from here (is screwed toward the lower jaw 3C), in the present embodiment, the pair of jaws 3B and 3C is elastically deformed so as to relatively separate from each other (in the present embodiment, to the side where the one jaw 3B separates opposite to the other jaw 3C) such that the male threaded portion 22A of the clamping screw 22 whose head 22B comes in contact with the lid 26 fixed to the other jaw 3C pushes up the one jaw 3B. Accordingly, the pair of contacting surfaces 4A and 4B also separates from each other, thereby widening the spacing.

Specifically, in the present embodiment, the head 22B of the clamping screw 22 comes in contact with the flat face 25C to the side where the pair of contacting surfaces 4A and 4B approaches each other in the contacting direction and comes in contact with the lid 26 to the side where the pair of contacting surfaces 4A and 4B separates from each other in the contacting direction, whereby the head 22B is abuttably received in the receiving hole 25 of the other jaw 3C via the lid 26 to both of the approaching and separating sides in the contacting direction. In addition, as shown in FIG. 5, in a state in which the head 22B comes in contact with the flat face 25C, a slight gap is provided between the end face of the head 22B and an end face of the lid 26 facing this end face within the receiving hole 25. Further, as for the twist direction of the threaded hole 24 of the mounting hole 23 and the male threaded portion 22A of the claming screw 22 threadedly engaged with the threaded hole, when the clamping screw 22 is rotated clockwise about the centerline O as seen from the top surface 3E of the head 33 similar to the operation of screwing a general right-hand screw, the pair of contacting surfaces 4A and 4B approaches each other to clamp the cutting insert 11, whereas when the clamping screw 22 is rotated counterclockwise as seen from the top surface 3E, the pair of contacting surfaces 4A and 4B separates from each other such that the cutting insert 11 can be inserted into or removed from the insert mounting seat 4.

Meanwhile, in the present embodiment, as shown in FIGS. 3 and 4, the head 3 at the tip of the holder 1 is provided with a control means 30 that controls the spacing (separation distance) between the pair of contacting surfaces 4A and 4B to be relatively separated from each other in the contacting direction when the pair of jaws 3B and 3C is elastically deformed with the clamping means 21. The control means 30 includes a separation control screw 31 to be inserted through the head 3 at the tip of the holder 1 in the contacting direction from below, and is provided at the other side surface opposite to one side surface of the insert mounting seat 4 rather than the clamping means 21.

The separation control screw 31 has a male threaded portion 31A that is threadedly attached to the upper jaw 3B beyond the slit 3A, and a head 31B that has a larger diameter than the male threaded portion 31A and is received in the lower jaw 3C. Further, an end face of the head 31B facing the bottom of the head 3 is formed with an engaging hole 31C that is engaged with a general-purpose working tool, such as a wrench. In addition, in the present embodiment, the outer shape of the head 31B is formed in the shape of a substantially thick-walled disk about a centerline O2 of the male threaded portion 31A.

Correspondingly, the head 3 is provided with a control screw mounting hole 32 into which the separation control screw 31 is mounted. The control screw mounting hole 32 is composed of a controlling threaded hole 32A to which the male threaded portion 31A at the upper jaw 3B is threadedly attached, and a receiving hole 32B that is formed coaxially with the controlling threaded hole 32A to receive the head 31B at the lower jaw 3C. The control screw mounting hole 32 is provided such that its centerline O2 is parallel to the centerline O of the clamping screw 22 of the above-mentioned clamping means 21. In addition, the controlling threaded hole 32A is opened to the top surface 3E of the head 3 through the upper jaw 3B from the slit 3A.

The receiving hole 32B of the control screw mounting hole 32 is opened to the slit 3A from the bottom surface of the head 3 through the lower jaw 3C, and is composed of a smaller diameter portion 32D and a larger diameter portion 32E in the named order downward from the slit 3A. The smaller diameter portion has an inner diameter that is smaller than the diameter of the head 31B of the separation control screw 31 and slightly larger than the diameter of the male threaded portion 31A, and the larger diameter portion has an inner diameter that is larger than that of the smaller diameter portion 32D such that it can receive the head 31B of the separation control screw 31. Accordingly, the male threaded portion 31A of the separation control screw 31 can be loosely fitted into the smaller diameter portion 32A with slight clearance. In addition, a connecting portion between the smaller diameter portion 32D and the larger diameter portion 32E is formed in the shape of an annular flat face 32F perpendicular to the centerline O2.

In the control means 30 configured as described above, the separation control screw 31 is mounted in the control screw mounting hole 32 by threadedly attaching the male threaded portion 31A of the separation control screw 31 to the controlling threaded hole 32A. It is noted here that the male threaded portion 31A is not completely screwed into the controlling threaded hole 32A, and the separation control screw 31 is installed with a predetermined gap between the head 31B and the flat face 32F so that the head 31B does not come in contact with the flat face 32F of the control screw mounting hole 32, in a state in which the cutting insert 11 is not clamped by the clamping means 21, as shown in FIG. 4.

In the insert detachable tool having such a clamping mechanism, in mounting the cutting insert 11 on the insert mounting seat 4 of the holder 1 to clamp it, first, a general-purpose working tool, such as a wrench, is inserted into and engaged with the engaging hole 22C formed in the end face of the male threaded portion 22A in the clamping screw 22 as the clamping means 21, through the opening of the threaded hole 24 in the top surface 3E of the upper jaw 3B of the head 3. Then, when the clamping screw 22 is rotated counterclockwise about the centerline O as seen from the top surface 3E, as described above, to retreat the clamping screw 22 with respect to the top surface 3E, the male threaded portion 22A elastically deforms the upper jaw 3B so as to push it up after the head 22B of the clamping screw 22 has come in contact with the lid 26, whereby the pair of contacting surfaces 4A and 4B separates from each other, widening the spacing therebetween.

At this time, as the upper jaw 3B is elastically deformed by the operation of the clamping means 21, the head 31B of the separation control screw 31 of the control means 30 moves within the larger diameter portion 32B toward the flat face 32F of the control screw mounting hole 32. Then, at the same time when the spacing (the spacing between the tip of the one contacting surface 4A and the other contacting surface 4B in the present embodiment) is widened to such an extent that the cutting insert 11 can be inserted, the head 31B of the separation control screw 31 comes in contact with the flat face 32F, so that the clamping screw 22 cannot be further rotated counterclockwise, and thus the spacing can be prevented from being excessively widened due to elastic deformation of the upper jaw 3B. This makes the spacing between the pair of contacting surfaces 4A and 4B to be the spacing suitable for inserting the cutting insert 11. In this state, the third contact surface 14C comes in contact with the third contacting surface 4C by inserting the cutting insert 11 toward the insert mounting seat 4 from the tip side of the holder 1 while the other contact surface 14B is brought into sliding contact with the other contacting surface 4B.

Next, when the clamping screw 22 is rotated clockwise as seen from the top surface 3E in a reverse direction to the above direction, the upper jaw 3B approaches the lower jaw 3C to narrow the spacing between the pair of contacting surfaces 4A and 4B, and the head 22B of the clamping screw 22 is separated from the lid 26. Then, the tip portion of the one contacting surface 4A comes in contact with the tip portion of the one contact surface 14A of the cutting insert 11. Then, when the clamping screw 22 continues to be further rotated, the head 22B comes in contact with the flat face 25C of the receiving hole 25 and thereafter, the one contacting surface 4A approaches the other contacting surface 4B to receive a screwing force so that the upper jaw 3B is elastically deformed, whereby the pair of contact surfaces 14A and 14B is pressed against the pair of contacting surfaces 4A and 4B, so that the cutting insert 11 is fastened, clamped, and fixed on the insert mounting seat 4.

In addition, in the present embodiment, since the one contacting surface 4A and the contact surface 14A are inclined so as to approach the other contacting surface 4B and the other contact surface 14B as they go toward the tip, as described above, the cutting insert 11 is pushed in toward the rear end of the insert mounting seat 4 by such pressing. For this reason, since the third contact surface 14C is pressed against the third contacting surface 3C, the cutting insert is more securely fixed. Further, if the spacing between the pair of contacting surfaces 4A and 4B in a state in which the upper jaw 3B is not elastically deformed is made smaller than the spacing between the pair of contact surfaces 14A and 14B of the cutting insert 11, at a point of time when the head 22B of the clamping screw 22 separates from the lid 26 and then the one contacting surface 4A comes in contact with the one contact surface 14A, the contact surface 14A is pressed by a restoring force when the upper jaw 3B will return to a state where it is not elastically deformed. Then, as the clamping screw 22 is further rotated, the cutting insert is more securely fastened.

Accordingly, according to the clamping mechanism for the cutting insert 11 configured as described above, first, the pair of jaws 3B and 3C is elastically deformed by only the clamping means 21 itself to the side where the pair of contacting surfaces 4A and 4B approaches each other or separates from each other in the contacting direction. Therefore, it is possible to carry out the clamping operation with only one general-purpose working tool, such as a wrench, that is engaged with the engaging hole 22C without necessitating a dedicated working tool, such as a slot expansion key described in Japanese Utility Model Registration No. 3063685 in clamping the cutting insert 11. Thus, the management of working tools can be simplified, the clamping operation itself can also be facilitated, and operator's efforts and time can be reduced, so that attachment/detachment or exchange of the cutting insert 11 can be efficiently performed.

Moreover, since the pair of jaws 3B and 3C can be elastically deformed by the clamping means 21 even in the direction that the contacting surfaces 4A and 4B separate from each other, as described above, even if the spacing between the pair of contacting surfaces 4A and 4B in a state in which the pair of jaws 3B and 3C is not elastically deformed is made equal to the spacing between the pair of contact surfaces 14A and 14B of the cutting insert 11, or is made slightly smaller than the spacing between the contact surfaces 14A and 14B, the cutting insert 11 can be inserted into the insert mounting seat 4 without any troubles by pushing the jaws 3B and 3C wide by the clamping means 21 to widen the spacing between the contacting surfaces 4A and 4B.

In this case, since the control means 30 is provided, in order for the pair of jaws 3B and 3C not to be deformed more greatly than the spacing between the pair of contacting surfaces 4A and 4B required to insert the cutting insert 11, the amount of deformation of the jaws, that is, the spacing between the pair of contacting surfaces 4A and 4B can be controlled. As a result, the pair of jaws 3B and 3C can be prevented from being plastically deformed due to the causes that the amount of operation of the clamping screw 22 may be increased more than needed or the holder 1 may be left as the spacing between the pair of contacting surfaces 4A and 4B is greatly widened. Thus, it is always possible to open the pair of contacting surfaces 4A and 4B with suitable spacing for insertion of the cutting insert 11 without damaging the clamping mechanism that clamps and holds the cutting insert 11.

Then, when the thus pushed and expanded jaws 3B and 3C are returned to their original state, the pair of contacting surfaces 4A and 4B comes in contact with the pair of contact surfaces 14A and 14B of the cutting insert 11 in a state in which the jaws 3B and 3C are not elastically deformed, or the contacting surfaces 4A and 4B are put in a state in which they presses the contact surfaces 14A and 14B as the jaws 3B and 3C are elastically deformed such that the spacing therebetween is slightly widened. Thus, a gap is generated to no small extent between the contacting surfaces and the contact surfaces in a state in which the jaws are not elastically deformed in inserting the cutting insert. Therefore, even if the jaws elastically deformed at the time of clamping will return to their original state, the clamping force will not be reduced. Accordingly, the clamping screw 22 is further rotated from the above states to add a screwing force in the direction that the pair of contacting surfaces 4A and 4B approaches each other, whereby the screwing force can be used as the clamping force in its entirely, or the spacing between the contacting surfaces 4A and 4B in a state in which they are not elastically deformed is made smaller than the spacing between the contact surfaces 14A and 4B, whereby the force when the upper and lower jaws 3B and 3C will return to their original state can be added to the clamping force. Thus, according to the clamping mechanism having the above configuration, a clamping force enough to firmly hold the cutting insert 11 can be obtained.

Further, in the present embodiment, the clamping means 21 that elastically deforms the pair of jaws 3B and 3C to the side where the pair of contacting surfaces 4B and 4C approaches each other and separates from each other in the contacting direction as described above, is the clamping screw 22 having the male threaded portion 22A threadedly attached to the upper jaw 3B and the head 22B received in the lower jaw 3B so as to be able to come in contact with the lid to both of the approaching and separating sides in the contacting direction. Since the upper jaw 3B can be elastically deformed to both of the approaching and separating sides in the contacting direction, as described above, by only the rotation of this clamping screw 22, the clamping operation can be further facilitated, and operator's efforts can be further alleviated. Moreover, as for the rotating operation of this clamping screw 22, when the clamping screw is rotated clockwise as seen from the top surface 3E similar to the operation of a general right-hand screw, the pair of contacting surfaces 4A and 4B approaches each other to clamp the cutting insert 11, whereas when the clamping screw is rotated counterclockwise as seen from the top surface 3E, the pair of contacting surfaces 4A and 4B separates from each other to unclamp the cutting insert 11. Thus, there are few cases that the clamping screw is erroneously rotated in the reverse direction, and the handling of the claming screw is easy.

Moreover, the receiving hole 25 of the lower jaw 3C that receives the head 22B of such a clamping screw 22 is composed of the smaller diameter portion 25A at the upper jaw 3B, the larger diameter portion 25B at the opposite side thereto, and the flat face 25C between the smaller and larger diameter portions. Also, the head 22B can come in contact with the flat face 25C to the approaching side in the contacting direction, whereas the head 22B can comes in contact with the lower jaw 3C via the lid 26 attached to the opening of the larger diameter portion 25B to the side where the contacting surface 4A and 4B separates from each other in the contacting direction. Thus, even if the head 22B comes in contact with any one of the approaching and separating sides, a comparatively large area of contact or a comparative large rigidity of the contacting portions can be ensured. Therefore, when the upper jaw 3B is pushed up and elastically deformed or when the upper jaw is brought close to the lower jaw 3C to clamp the cutting insert 11, it is possible to prevent the clamping means 21 from being deformed or damaged due to an elastic deformed force or a screwing force at that time, and it is also possible to stably clamp the cutting insert 11 for a prolonged period of time.

Moreover, in the present embodiment, the lid 26 is attached by screwing the male threaded portion 26A into the female threaded portion 25D formed in the opening of the larger diameter portion 25B of the receiving hole 25 opposite to the upper jaw 3B, and the twist direction of threads in the male threaded portion 26A and the female threaded portion 25D, is reverse to the twist direction of threads in the threaded hole 24 of the upper jaw 3B and the male threaded portion 22A of the clamping screw 22 threadedly attached to this threaded hole. Thus, even if the end face of the head 22B of the clamping screw 22 comes in contact with the lid 26 to the side where the pair of contacting surface 4A and 4B separates from each other in the contacting direction, as described above, and the clamping screw 22 is further rotated to push up the upper jaw 3B, the lid 26 pressed against the end face of the head 22B will not rotate together with the clamping screw 22. Therefore, the cutting insert 11 can be stably and reliably attached or detached without causing problems, for example, that due to such co-rotation, the male threaded portion 26A is loosened form the female threaded portion 25D or that the lid 26 comes off from the receiving hole 25.

Further, as described above, in the present embodiment, the receiving hole 25 that receives the larger-diameter head 22B of the clamping screw 22 is formed in the lower jaw 3C that is larger in thickness in the contacting direction in the head 3 at the tip of the holder 1. Thus, it is possible to reliably ensure the space to form the receiving hole 25 that requires a large inner diameter and length along the centerline O, including attachment of the lid 26. On the other hand, since the thinner upper jaw 3B is only needed to be formed with the threaded hole 24 to which the smaller-diameter male threaded portion 22A of the clamping screw 22 is threadedly attached, the threaded hole 24 can be bored in a position closer to the insert mounting seat 4 as much as possible. In particular, when the upper jaw 3B is elastically deformed to the side where the pair of contacting surfaces 4A and 4B approaches each other in the contacting direction, the threaded hole 24 is located away from the insert mounting seat 4. Therefore, it is possible to suppress occurrence of inclination in a cross-section orthogonal to the longitudinal direction, in the one contacting surface 4A. As a result, since the contacting surface 4A is brought into close contact with the one contact surface 14A of the cutting insert 11, non-contact between the contacting surface 4A and the contact surface 14A caused by this inclination can be prevented to more firmly clamp the cutting insert 11.

Moreover, since the thin-walled upper jaw 3A is located at the rake face 12A of the cutting insert 11, chips produced by the cutting edges 13 can be easily discharged beyond the upper jaw 3A, and thus smooth chip disposal can be performed. In addition, in the present embodiment, since the tip of the upper jaw 3A is formed in the shape of a triangular plate having an oblique side that approaches the lower side as it goes toward the tip in side view, so that chips flowing out rearward along the rake face 12A of the cutting insert 11 are guided by the oblique side. Consequently, the chips can also be more smoothly discharged, riding over the upper jaw 3A.

Moreover, in the clamping mechanism of the present embodiment, the one contacting surface 4A formed in the upper jaw 3A is formed such that its tip is inclined toward the other contacting surface 4B as it goes toward the tip. Similarly, in the cutting insert 11 of the present embodiment, the one contact surface 14A to come in contact with the one contact surface 4A is also formed such that its tip is inclined toward the other contact surface 14B as it goes toward the tip. Accordingly, at the time of clamping, as described above, the cutting insert 11 is pushed in toward the rear side of the insert mounting seat 4, and thus the third contacting surface 14C comes in contact with the third contacting surface 4C. As a result, the cutting insert 11 can be more stably and securely clamped.

Further, for example, even when cutting is performed by corners of the cutting edges 13 while the holder 1 is retreated from a workpiece, the contacting surface 4A can prevent the cutting insert from coming off against a load acting on the cutting insert 11 toward the tip, and thus occurrence of situations that the cutting insert 11 shifts or comes off can be prevented. Also, even if the tip portions of the contacting surface 4A and the contact surface 14A are inclined as described above, or even if the spacing between the pair of contacting surfaces 4A and 4B should be more greatly widened at the time of insertion of the cutting insert 11, according to the clamping mechanism having the above configuration, the pair of upper and lower jaws 3B and 3C can be elastically deformed greatly and easily by the operation of the clamping means 21, and yet, in a state in which the contacting surfaces 4A and 4B come in contact with the contact surfaces 14A and 14B of the cutting insert 11, it is possible to securely clamp the cutting insert 11 by preventing an elastic deformation force from acting in the direction that the pair of upper and lower jaws 3B and 3C separate from each other.

Figure 6:
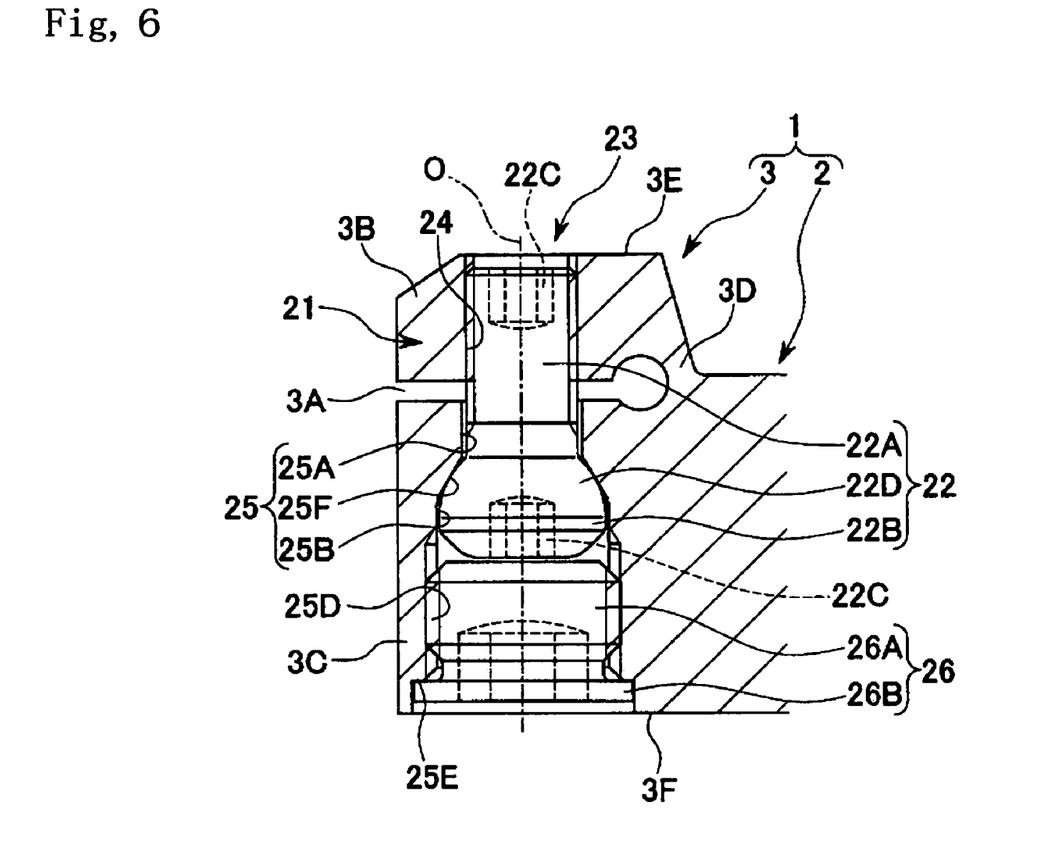
FIG. 6 is a cross-sectional view corresponding to the cross-sectional view taken along line YY in FIG. 3, which shows a second embodiment of the clamping mechanism of the invention.

Next, FIG. 6 is a cross-sectional view showing a second embodiment of the clamping mechanism of the invention. In this drawing, the portions common to those in the first embodiment shown in FIGS. 1 to 5 are denoted by the same reference numerals, and the description thereof will be omitted. That is, in the above first embodiment, the flat face 25C perpendicular to the centerline of the receiving hole 25 is formed between the smaller diameter portion 25A and the larger diameter portion 25B of the receiving hole 25. The outer shape of the head 22B of the clamping screw 22 is formed in the shape of a thick-walled disk. The rear face of the head 22B coming in contact with the flat face 25C is also formed as a flat face perpendicular to the centerline O of the clamping screw 22. Accordingly, when the upper jaw 3B is elastically deformed to the side where the pair of contacting surfaces 4A and 4B approaches each other, the rear face is brought into close contact and comes in contact with the flat face 25C. In contrast, this second embodiment is characterized in that at least any one of a portion between the smaller diameter portion 25A and the larger diameter portion 25B of the receiving hole 25 and a portion of the head 22B of the clamping screw 22 that faces the upper jaw 3B is formed so as to be gradually reduced in diameter, that is, to have a smaller diameter, as it goes toward the upper jaw 3B.

More specifically, in the present embodiment, the portion between the smaller diameter portion 25A and the larger diameter portion 25B of the receiving hole 25 is formed as a concave conical portion 25F that is gradually reduced in diameter as it goes from the larger diameter portion 25B to the smaller diameter portion 25A about the centerline of the receiving hole 25. Also, the rear face of the head 22B of the clamping screw 22 that faces the upper jaw 3B, is formed as a convex spherical portion 22D having its center on the center O of the clamping screw 22. Both of those portions are formed in the shape of a curved surface that is gradually reduced in inner and outer diameters as they approach the upper jaw 3B. That is, in the curved surfaces in the present embodiment, their cross-sections orthogonal to their respective centerlines form a circular shape. Also, when the upper jaw 3B is elastically deformed to the side where the pair of contacting surfaces 4A and 4B approaches each other in the contacting direction, a mutually contacting portion between the smaller diameter portion 25A and the larger diameter portion 25B of the receiving hole 25 and in the rear face of the head 22B of the clamping screw 22 is formed as a curved line that is curved toward the upper jaw 3B in the cross-section parallel to the centerline O passing through the contacting portion (a concavely curved line that becomes concave toward the upper jaw 3B at the receiving hole 25, and a convexly curved line that becomes convex toward the upper jaw 3B at the head 22B).

However, as described above, in the clamping mechanism in which the cutting insert 11 is clamped by elastically deforming the upper jaw 3B to deflect it toward the lower jaw 3C about the connecting portion 3D as a fulcrum, there is a fear that the centerline of the threaded hole 24 may be inclined with respect to the centerline of the receiving hole 25 of the lower jaw 3C due to the inclination of the upper jaw 3B, and thus the clamping screw 22 may be bent or deformed between the head 22B coming in contact with the portion between the smaller diameter portion 25A and the larger diameter portion 25B of the receiving hole 25 and the male threaded portion 22A threadedly attached to the threaded hole 24, at the time of clamping. In addition, even in the upper jaw 3B, there is a fear that the upper jaw 3B may be distorted and elastically deformed along with bending of the clamping screw 22, and thus the one contacting surface 4A is not brought into close contact with and does not come in contact with the one contact surface 14A of the cutting insert 11. From these viewpoints, in the above first embodiment, the inner diameter of the smaller diameter portion 25A is made slightly larger than the outer diameter of the male threaded portion 22A so as to allow clearance, so that the clamping screw 22 can follow the inclination of the centerline to some extent. However, in the first embodiment in which a substantially disk-shaped head 22B comes in contact with the flat face 25C of the receiving hole 25, there is a fear that, if the clamping screw 22 is inclined in this way, the stability may be deteriorated due to contact in point contact between the head and the flat face.

Meanwhile, in the clamping mechanism of the above second embodiment, the concave conical portion 25F is formed between the smaller diameter portion 25A and the larger diameter portion 25B of the receiving hole 25, and the rear face of the head potion 22B of the clamping screw 22 that faces the upper jaw 3B is formed as the convex spherical portion 22D. Thus, even when the clamping screw 22 is inclined, the concave conical portion 25F and the convex spherical portion 22D can maintain a contacting state in mutually line contact. Accordingly, according to the present embodiment, even if inclination is caused in the upper jaw 3B as described above, the clamping screw 22 can be tilted so as to follow the inclination, and thus the clamping screw 22 can be prevented from being deformed or damaged by preventing the clamping screw from being bent. Also, the one contacting surface 4A and the contact surface 14A can be reliably brought into close contact with and come in contact with each other by preventing the upper jaw 3B from being distorted and elastically deformed. Moreover, since the stability of clamping of the cutting insert 11 can be sufficiently ensured even when the clamping screw 22 is tilted in this way, the cutting insert 11 is securely held, so that smooth cutting can be performed.

In addition, in the present embodiment, as described above, the portion between the smaller diameter portion 25A and the larger diameter portion 25B of the receiving hole 25A is formed as the concave conical portion 25F, and the rear face of the head 22B of the clamping screw 22 is formed as the convex spherical portion 22D, so that both of them are formed so as to be reduced in diameter toward the upper jaw 3B. However, only any one of them may be formed in this way, and the other one may be formed as in the first embodiment. For example, even if the head 22B of the clamping screw 22 is formed in a disk shape similar to the first embodiment, and the concave conical portion 25F and/or a concave spherical portion concaved toward the upper jaw 3B is formed in the receiving hole 25, an intersecting ridgeline between the rear face and a circumferential face of the head 22B comes into line contact with the concave conical portion 25F and the concave spherical portion when the clamping screw 22 is tilted. Thus, stable clamping can be achieved.

On the contrary, in the receiving hole 25, similar to the first embodiment, the portion between the smaller diameter portion 25A and the larger diameter portion 25B is formed as the flat face 25C perpendicular to the centerline, and the rear face of the head 22B of the clamping screw 22 may be formed as the convex spherical portion 22D and/or a convex conical portion about the centerline of the clamping screw 22. In this case, when the clamping screw 22 is tilted, the convex spherical portion 22D or the convex conical portion comes into line contact with the intersecting ridgeline between the smaller diameter portion 25A and the flat face 25C of the receiving hole 25, so that the stability of clamping can be ensured. Moreover, if the rear face of the head 22B of the clamping screw 22 is formed as the convex spherical portion 22D, and the concave spherical portion that can be brought into sliding contact with this convex spherical portion 22D is formed in the receiving hole 25, even if the clamping screw 22 is tilted, the convex spherical portion and the concave spherical portion can come in contact with each other in a state nearer to surface contact, and thus the stability of clamping can be further improved. Further, if the rear face of the head 22B of the clamping screw 22 is formed as the convex conical portion or convex spherical portion in this way, the portion between the smaller diameter portion 25A and the larger diameter portion 25B of the receiving hole 25 may be formed into a curved surface that is reduced in diameter as it goes toward the upper jaw 3B while the cross-section along the centerline of the receiving hole 25 is convexly curved toward its inner circumference. Here, if both of the portion between the smaller diameter portion 25A and the larger diameter portion 25B and the rear face of the head 22B are formed in a concave-convex conical shape whose taper angles are equal to each other, there is a fear that smooth tilting of the clamping screw 22 may be hindered instead. Thus, if both of them are formed so as to be reduced in diameter toward the upper jaw portion 3B, it is preferable avoid such a combination. smooth tilting of the clamping screw 22 may be hindered instead. Thus, if both of them are formed so as to be reduced in diameter toward the upper jaw portion 3B, it is preferable avoid such a combination.

Figure 7:
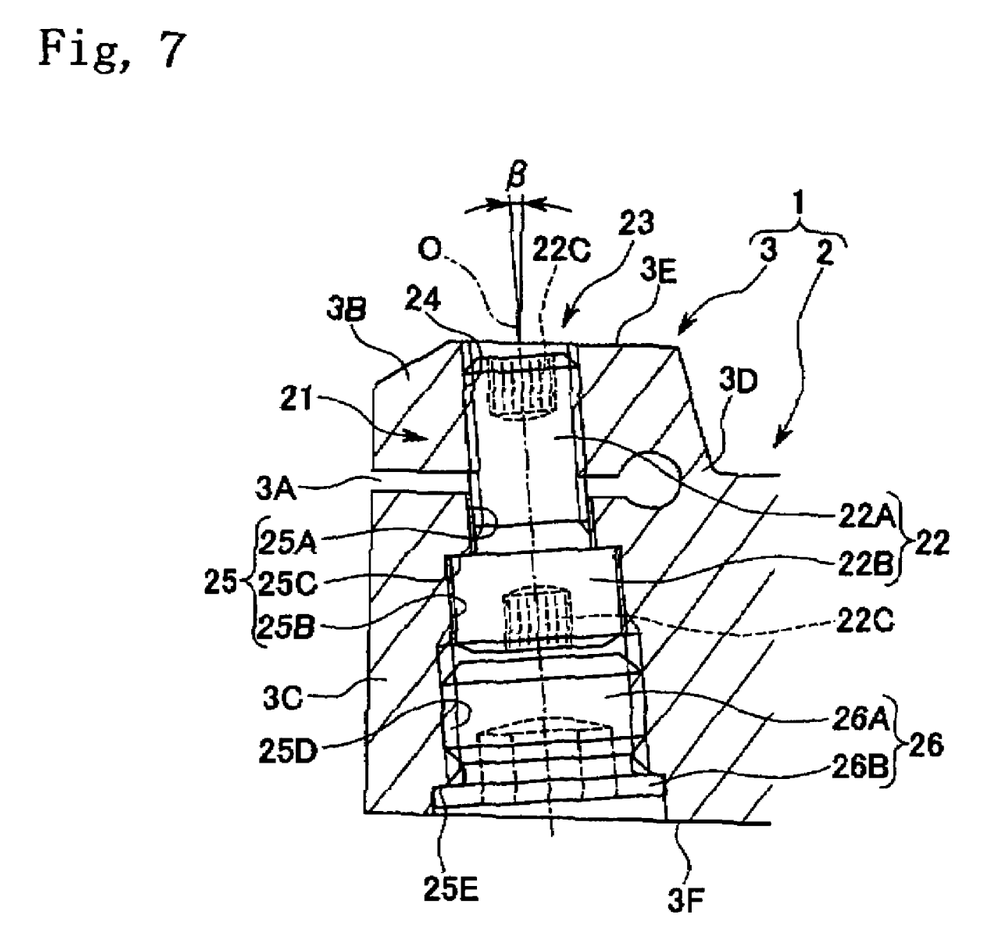
FIG. 7 is a cross-sectional view corresponding to the cross-sectional view taken along line ZZ in FIG. 3, which shows a third embodiment of the clamping mechanism of the invention.

Furthermore, FIGS. 7 and 8 show a third and a fourth embodiments of the clamping mechanism of the invention, respectively. In these drawings, the portions common to those in the first and second embodiments shown in FIGS. 1 to 6 are also denoted by the same reference numerals. In addition, in the third embodiment, similar to the first embodiment, the portion between the smaller diameter portion 25A and the larger diameter portion 25B of the receiving hole 25 is formed as the flat face 25C perpendicular to the centerline, and the head 22B of the clamping screw 22 is formed in the shape of a thick-walled disk. In the fourth embodiment, similar to the second embodiment, the portion between the smaller diameter portion 25A and the larger diameter portion 25B of the receiving hole 25 is formed as the concave conical portion 25F, and the rear face of the head 22B of the clamping screw 22 is formed as the convex spherical portion 22D.

Also, in the first and second embodiments, the centerline O of the clamping screw 22 and the centerline of the mounting hole 23, which are made coaxial with each other, are formed perpendicular to an extension face along which the slit 3A extends, whereas the third and fourth embodiments is characterized in that the centerline O is inclined with respect to the extension face. Further, the direction that the centerline O is inclined, is a direction that is closer to a longitudinal tip side toward the upper jaw 3B from the lower jaw 3C, and the side surface 2A in the shank 2 of the holder 1 formed with the insert mounting seat 4 (in FIG. 3, a direction that the line ZZ showing a cross-section extends), that is, the centerline O extends in a direction that it is inclined with respect to both the longitudinal direction and the width direction of the contacting surfaces 4A and 4B in plan view.

In these third and fourth embodiments, since the centerline O of the mounting hole 23 and the clamping screw 22 is inclined in the width direction so as to approach the insert mounting seat 4 toward the upper jaw 3B from the lower jaw 3C, the position of the receiving hole 25 formed in the lower jaw 3C is almost the same as that in the first and second embodiments, but the position of the threaded hole 24 to which the male threaded portion 22A of the clamping screw 22 in the upper jaw 3B is threadedly attached, can be a position closer to the insert mounting seat 4 as compared with the first and second embodiments. Therefore, the one contact surface 14A of the cutting insert 11 can come in contact with and pressed by the one contacting surface 4A of the insert mounting seat 4 from a position closer to immediately above, and thus the stability of clamping in the cutting insert 11 can be further improved.

Further, even in the third and fourth embodiments, the upper jaw 3B is elastically deformed so as to be bent toward the lower jaw 3C about the portion 3D to be connected with the lower jaw 3C as a fulcrum. However, the centerline O of the mounting hole 23 and the clamping screw 22 is also inclined so as to approach the tip side in the longitudinal direction toward the upper jaw 3B from the lower jaw 3C, that is, is inclined in a direction along the inclination caused by bending of the upper jaw 3B. Accordingly, according to these third and fourth embodiments, it is possible to suppress that the centerline of the threaded hole 24 in the mounting hole 23 is inclined respect to the centerline of the receiving hole 25 due to the inclination caused by the elastic deformation of the upper jaw 3B, and it is possible to more reliably prevent bending or deformation of the clamping screw 22. Also, the upper jaw 3B can be prevented from being distorted and elastically deformed, and more stable clamping of the cutting insert 11 can be promoted.

In addition, as for the inclination of the centerline O of the mounting hole 23 and the clamping screw 22, as shown in FIG. 3, it is preferable that the angle of inclination α with respect to the longitudinal direction of the cutting insert 11 in plan view (for example, angle of inclination of the line ZZ with respect to the plane P in plan view) be in a range of 5° to 70°. Also, as shown in FIGS. 7 and 8, it is preferable that the angle of inclination β with respect to the extension face in the cross-section taken along the centerline O on the line ZZ be in a range of 2° to 45°. If the inclination is less than the above ranges, there is a fear that the above-described effects cannot be sufficiently exhibited, whereas if the inclination is greater than the above ranges, there is a fear that the inclination of the centerline O becomes greater than the inclination caused by the elastic deformation of the upper jaw 3B, and all the more the clamping screw 22 may be easily bent or the upper jaw 3B may be easily distorted. Further, the centerline O may be inclined in at least any one of the longitudinal direction and the width direction. Moreover, if the centerline O of the mounting hole 23 and the clamping screw 22 is inclined in this way, it is preferable that the centerline O2 of the separation control screw 31 also be inclined so as to be parallel to the centerline O.

Meanwhile, in the above first to fourth embodiments, the tip portions of the one contacting surface 4A of the insert mounting seat 4 at the upper jaw 3B and the one contact surface 14A at the top surface of the cutting edge 11 are inclined so as to approach the other contacting surface as it goes toward the tip. However, for example, if any load does not act on the cutting insert 11 toward the tip, the one contacting surface 4A and the contact surface 14A may be formed so as to extend straight in the longitudinal direction parallel to the other contacting surface 4B and the other contact surface 14B. Moreover, in these embodiments, the lid 26 is attached by screwing the male threaded portion 26A into the female threaded portion 25D of the receiving hole

25. However, it is possible to adopt a configuration in which the lid 26 is be of a bottomed cylindrical cap type having a female threaded portion at the inner circumference thereof, and a cylindrical wall having a male threaded portion threadedly engaged with the female threaded portion formed at the outer circumference thereof is provided in the opening of the receiving hole 25 so as to protrude therefrom, and the lid 26 is attached to the opening of the receiving hole 25 opposite to the upper jaw 3B by threadedly attaching the female and male threaded portion to each other.

In the clamping mechanism configured as described above, since the pair of jaws is elastically deformed by the clamping means to the side where the pair of contacting surfaces approaches each other in the contacting direction or contrary to this, to the side where the pair of contacting surfaces separates from each other in the contacting direction, the cutting insert can be attached to or detached from the insert mounting seat with the spacing between the pair of contacting surfaces by a single working tool for operating the clamping means, and the cutting insert inserted into the insert mounting seat in this way can be clamped so as to narrow the spacing. As a result, it is possible to avoid troublesome problems that workers are compelled to manage working tools or use a plurality of kinds of working tools properly. Also, when the cutting insert inserted into the insert mounting seat is clamped, the pair of jaws comes in contact with the cutting insert in a state in which they are not elastically deformed or the pair of contacting surfaces comes in contact with the cutting insert in a state in which they are elastically deformed in their separating direction, and from this state, the pair of jaws can be brought close to each other in the contacting direction so as to clamp the cutting insert. Thus, it is possible to suppress a reaction force when the jaws will return to their original state, or it is possible to direct the reaction force so as to act in the direction that the cutting insert is clamped. As a result, the cutting insert can be securely clamped by a sufficient clamping force.

Here, as a clamping means that bring the pair of jaws close to each other or separates them from each other as described above, it is possible to adopt a clamping screw that is inserted through the tip of the holder in the contacting direction, and that has a male threaded portion threadedly attached to one jaw of the pair of jaws, and a head abuttably received in the other jaw to both of approaching and separating sides in the contacting direction. Specifically, when the male threaded portion of such a clamping screw is screwed into the one jaw and thus the head comes in contact with the other jaw toward the side where the pair of contacting surfaces approaches each other in the contacting direction, the one head to which the male threaded portion is threadedly attached is elastically deformed relative to the other jaw coming in contact with the head so as to be pulled thereinto. Conversely, when the clamping screw is rotated so that the male threaded portion is extracted from the one jaw, the head comes in contact with the other jaw toward side where the pair of contacting surfaces separates from each other in the contacting direction, whereby the one jaw is elastically deformed and separated from the other jaw so as to be pushed out therefrom.

Further, in abuttably receiving the head of the clamping screw in the other jaw to both of the approaching and separating sides in the contacting direction, the other jaw is formed with a receiving hole having a smaller diameter portion that has a smaller diameter than that of the head opened toward the one jaw and into which the male threaded portion can be loosely fitted, and a larger diameter portion that is opened opposite to the one jaw and is able to receive the head. Also, a lid is mounted to an opening of the receiving hole opposite to the one jaw. Therefore, the head of the clamping screw can come in contact with a stepped portion between the smaller diameter portion and the larger diameter portion to the side where the pair of contacting surfaces approaches each other in the contacting direction, while the head of the clamping screw can come in contact with the lid to the side toward the separating side. As a result, the pair of jaws and their contacting surfaces can be brought close to or separated from each other by rotational operation of the clamping screw. In addition, in this case, a screw member threadedly attached to a threaded portion formed in the opening of the receiving hole opposite to the one jaw, is adopted as the lid, and the twist direction of the threaded portion is reverse to the twist direction of the male threaded portion of the clamping screw. Therefore, even if the clamping screw is rotated to come in contact with the lid to the side where the pair of contacting surfaces separates from each other as described above, it is possible to prevent the lid from being rotated together with the clamping screw by the rotational operation of the clamping screw, thereby coming off from the threaded portion.

Moreover, in this case, at least any one of a portion of the receiving hole between the smaller diameter portion and the larger diameter portion and a portion of the head facing the one jaw is formed so as to be gradually reduced in diameter as it goes toward the one jaw. Therefore, even if the centerline of the threaded hole of the one jaw to which the female threaded portion is threadedly attached, and the centerline of the receiving hole of the other jaw is inclined by elastic deformation of the jaws, the clamping screw can be tilted so as to follow the inclination and thus the clamping screw can be prevented from being bent. Also, even in a state in which the clamping screw is tilted in this way, the head and the receiving hole can come in contact with each other in at least line contact. Thus, the stability of clamping can be reliably maintained. In addition, in reducing the diameter of the portion between the smaller diameter portion and the larger diameter portion of the receiving hole or the head of the clamping screw, for example, the portion of the smaller diameter portion and the larger diameter portion of the receiving hole may be formed in the shape of a concave spherical surface or a concave conical surface that become concave toward one jaw, and in the head of the clamping screw, the portion facing the one jaw may be formed in the shape of a convex spherical surface or a convex conical surface. Further, for example, if the portion of the head of the clamping screw facing the one jaw is formed in the shape of convex conical surface, the portion between the larger and smaller diameter portions of the receiving hole may be formed in the shape of a curved surface that is reduced in diameter as it goes toward the one jaw while a cross-section along the centerline of the receiving hole is convexly curved toward the inner circumference.

Furthermore when the above-described clamping screw is used as the clamping means, the pair of the jaws is formed such that the one jaw is located at a rake face of a cutting edge of the cutting insert so as to be smaller in thickness in the contacting direction than the other jaw. As a result, an enough space to receive the head of the clamping screw can be ensured in the other thick-walled large jaw. On the other hand, when the male threaded portion of the clamping screw is screwed as described above, the one thin-walled jaw is elastically deformed so as to approach the other thick-walled jaw. However, in the one jaw, a threaded hole to which the male threaded portion of the clamping screw is threadedly attached can be formed in a position closer to the insert mounting seat as much as possible, as compared with forming the receiving hole to receive the larger-diameter head. Thus, it is possible to suppress inclination caused by elastic deformation of the one jaw in the vicinity of the insert mounting seat as much as possible, and it is possible to reliably bring the contacting surface into contact with the cutting insert to clamp the cutting insert. Further, the one thick-walled jaw is located at the rake face of the cutting edge, so that chips produced by the cutting edge can be smoothly discharged without any hindrance.

Moreover, the tip of the holder is provided with a control means that controls a separation distance between the pair of contacting surfaces to be separated by the clamping means. As a result, for example, it is possible to prevent the pair of contacting surfaces from being separated from each other more than needed due to excessive rotation of the clamping screw. Accordingly, it is possible to prevent loss of a clamping function of holding the cutting insert due to the following reasons that the spacing between the pair of contacting surfaces is greatly widened excessively by the operation of the clamping screw so that the amount of operation of the clamping screw becomes large more than needed at the time of attachment/detachment of the cutting insert, and that the holder is left as the spacing between the contacting surfaces is greatly widened, and thus, for example, the pair of relatively elastically deformed jaws, is plastically deformed. In other words, such a control means is provided, so that the separation distance of the pair of contacting surfaces can be controlled within a range in which the cutting insert can be inserted and the pair of jaws is not plastically deformed.

On the other hand, in the clamping mechanism of the invention, one contacting surface of the pair of contacting surfaces is inclined such that at least a tip portion thereof approaches the other contacting surface as it goes toward the tip. Further, in a cutting insert to be clamped by such a clamping mechanism, one contact surface of the cutting insert that comes in contact with the one contacting surface is inclined such that at least a tip portion thereof approaches the other contact surface in accordance to the inclination of the one contacting surface as it goes toward the tip. As a result, it is possible to prevent the cutting insert from being extracted to the tip side by virtue of contact of the inclined contacting surfaces and contact surfaces. Also, even when the one contacting surface is inclined in this way so as to narrow the spacing between the pair of contacting surfaces toward the tip, according to the clamping mechanism having the above configuration, the pair of jaws is separated from each other by the clamping means so that the spacing between the pair of contacting surfaces can be easily widened. Thus, insertion of the cutting insert into the insert mounting seat can be more smoothly performed.

What is claimed is:

1. A clamping mechanism for a cutting insert comprising:
an insert mounting seat for receiving the cutting insert;
a holder having a pair of contacting surfaces facing each other, the insert mounting seat being formed in a tip of the holder, and the cutting insert having a pair of contact surfaces to contact the pair of contacting surfaces, respectively, the holder comprising:
  a tip provided with a pair of jaws that is formed with the pair of contacting surfaces, respectively, and is elastically deformable relatively in a direction that the contacting surfaces contact the contact surfaces;
  a clamping screw comprising:
    a male threaded portion threadedly attached to an upper jaw of the pair of jaws;
    a head received in a lower jaw of the pair of jaws, and the lower jaw comprising:
      a receiving hole having a smaller diameter portion that has a smaller diameter than that of the head opened toward the upper jaw and into which the male threaded portion can be loosely fitted; and
      a larger diameter portion that is opened opposite to the upper jaw for receiving the head; and
    a lid mounted to an opening of the receiving hole opposite to the upper jaw,
  wherein the clamping screw elastically deforms the pair of jaws to bring relatively the pair of contacting surfaces close to each other and to separate them relatively from each other.

2. The clamping mechanism according to claim 1, wherein the clamping screw is inserted through the tip of the holder from the lower jaw to the upper jaw in the contacting direction and the head is abuttably received in the lower jaw to both of the approaching and separating sides in the contacting direction.

3. The clamping mechanism for a cutting insert according to claim 1, wherein the lid is a screw member threadedly attached to a threaded portion formed in the opening of the receiving hole opposite to the upper jaw, and the twist direction of the threaded portion is reverse to the twist direction of the male threaded portion of the clamping screw.

4. The clamping mechanism for a cutting insert according to claim 1, wherein at least either a portion between the smaller diameter portion and the larger diameter portion of the receiving hole or a portion of the head facing the upper jaw gradually reduces in diameter as the respective portion approaches the upper jaw.

5. The clamping mechanism for a cutting insert according to claim 1, wherein the upper jaw is located at a rake face of a cutting edge of the cutting insert to be smaller in thickness in the contacting direction than the lower jaw.

6. The clamping mechanism for a cutting insert according to claim 1, further comprising:
a control means provided at the tip of the holder for controlling a distance of separation between the pair of contacting surfaces, which are separated by the clamping screw.

7. The clamping mechanism for a cutting insert according to claim 1, wherein one contacting surface of the pair of contacting surfaces is inclined such that at least a tip portion thereof approaches the other contacting surface.

8. A cutting insert to be clamped by the clamping mechanism according to claim 7, wherein one contact surface of the cutting insert that contacts the one contacting surface is inclined such that at least a tip portion thereof approaches the other contact surface as the one contacting surface inclines.

9. A clamping mechanism for a cutting insert, comprising:
a holder having first and second contacting surfaces facing each other, the holder further comprising a tip provided with a pair of jaws that is respectively formed with the first and second contacting surfaces;
a cutting insert having first and second contact surfaces that contact the first and second contacting surfaces of the holder, respectively, to define a contacting direction;
an insert mounting seat formed in the tip of the holder for receiving the cutting insert;

a clamping screw inserted through the tip of the holder in the contacting direction, the screw further comprising:
   a male threaded portion threadedly attached to a first jaw of the pair of jaws; and
   a head abuttably received in a second jaw of the pair of jaws to both of the approaching and separating sides in the contacting direction,
a receiving hole comprising:
   a smaller diameter portion that has a smaller diameter than that of the head opened toward the first jaw, and
   a larger diameter portion that is opened opposite to the first jaw for receiving the head,
a lid mounted to an opening of the receiving hole opposite to the first jaw.

10. The clamping mechanism for a cutting insert according to claim 9, wherein the lid is a screw member threadedly attached to a threaded portion formed in the opening of the receiving hole opposite to the first jaw, and the twist direction of the threaded portion is reverse to the twist direction of the male threaded portion of the clamping screw.

11. The clamping mechanism for a cutting insert according to claim 9, wherein at least either a portion between the smaller diameter portion and the larger diameter portion of the receiving hole or a portion of the head facing the first jaw gradually reduces in diameter as the respective portion approaches the first jaw.

12. A clamping mechanism for a cutting insert, comprising:
   a holder having first and second contacting surfaces facing each other, the holder further comprising a tip provided with a pair of jaws that is respectively formed with the first and second contacting surfaces;
   a cutting insert having first and second contact surfaces that contact the first and second contacting surfaces of the holder, respectively, to define a contacting direction;
   an insert mounting seat formed in the tip of the holder for receiving the cutting insert;
   a clamping screw inserted through the tip of the holder in the contacting direction; and
   a control screw provided at the tip of the holder for controlling a distance of separation between the first and second contacting surfaces.

13. The clamping mechanism for a cutting insert according to claim 12, wherein the clamping screw further comprises:
   a male threaded portion threadedly attached to a first jaw of the pair of jaws; and
   a head abuttably received in a second jaw of the pair of jaws to both of the approaching and separating sides in the contacting direction.

14. The clamping mechanism for a cutting insert according to claim 13, wherein the control screw further comprises:
   a male threaded portion threadedly attached to the first jaw; and
   a head having a larger diameter than tat of the male threaded portion and disposed in the second jaw.

15. The clamping mechanism for a cutting insert according to claim 12, further comprising:
   a control screw mounting hole having at least one flat face,
   wherein a head of the control screw contacts the flat face of the control screw mounting hole to prevent the clamping screw from over-rotation.

16. The clamping mechanism for a cutting insert according to claim 1, further comprising:
   a concave conical-shaped portion located between the smaller diameter portion and the larger diameter portion of the receiving hole, the concave conical-shaped portion gradually reducing in diameter from the larger diameter portion towards the smaller diameter portion,
   wherein a rear face of the head of the clamping screw is correspondingly shaped as convex spherical portion so as to lie in the concave conical-shaped portion.

17. The clamping mechanism for a cutting insert according to claim 9, further comprising:
   a concave conical-shaped portion located between the smaller diameter portion and the larger diameter portion of the receiving hole, the concave conical-shaped portion gradually reducing in diameter from the larger diameter portion towards the smaller diameter portion,
   wherein a rear face of the head of the clamping screw is correspondingly shaped as convex spherical portion so as to lie in the concave conical-shaped portion.

* * * * *